I. Perego Jr.
Shirt Bosom.
No. 92
1197
Reissued June 11, 1861
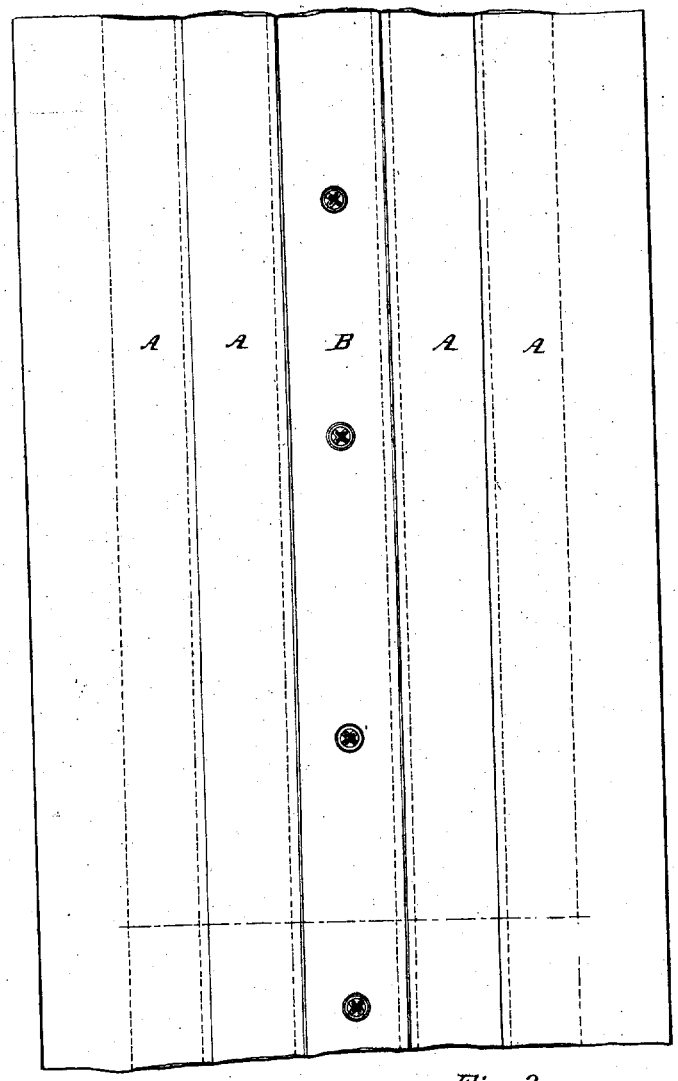
Fig. 2
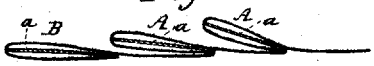
Fig. 3.
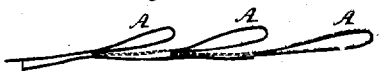
Witnesses.
J. W. Coombs.
R. S. Spencer
Inventor.
Ira Perego Jr.
per Munn & Co
Attorneys

UNITED STATES PATENT OFFICE.

IRA PEREGO, JR., OF NEW YORK, N. Y.

IMPROVEMENT IN SHIRT-BOSOMS.

Specification forming part of Letters Patent No. 30,154, dated September 25, 1860; Reissue No. 1,197, dated June 11, 1861.

*To all whom it may concern:*

Be it known that I, IRA PEREGO, Jr., of New York city, in the county and State of York, have invented a new and useful Improvement in Shirt-Bosoms; and I do hereby declare that the following is a full, clear, and exact description thereof, reference being had to the accompanying drawings, making a part of this specification, in which—

Figure 1 is a front view of the improved bosom. Fig. 2 is a section through three of the plaits of Fig. 1. Fig. 3 is a section through a bosom wherein the stiffening is sewed across the back part thereof instead of being inserted in each plait, as in Figs. 1 and 2.

Similar letters of reference indicate corresponding parts in the three figures.

The object of this invention and improvement in shirt-bosoms is to prevent the upper part of the bosom, which is usually in sight, from rumpling or drawing up, and thus presenting a bad unsightly appearance after being worn but a short time.

The nature of my invention consists in the employment of an extra thickness or thicknesses of cotton, linen, or other suitable material, so applied to the bosom of a shirt or interwoven with the material of which the bosom is made that the upper part of the bosom, or that part which is in sight, will be rendered less flexible than the lower part of the bosom, thus, when the bosom is starched and ironed in the usual manner, it will be seen the unstiffened part will break first and have the effect of keeping the upper portion stiff and unbroken for a considerable length of time, as will be hereinafter described and represented.

To enable those skilled in the art to fully understand my invention, I will proceed to describe its construction and operation.

A A A represent the plaits on each side of the middle plait, B. These plaits A are made by folding over the material in the usual manner, after which the plaits are stitched along the edges; but previously to thus stitching them one or more strips, *a*, of linen, cotton, or other suitable fabric of the same width as the plaits, is inserted between the two thicknesses of material of each plait. Said pieces extend in length from the collar-band down to within about one third or fourth of the length of the bosom, and when the plaits are thus stitched up these inserted strips *a* will be secured in a proper manner. Instead of inserting the strips *a* between the two thicknesses of material forming the plaits, these strips may be stitched on the "inside" of the plaits, or for common shirts the extra thickness or stiffening strip or strips may be applied to the inside of the bosom, as represented in Fig. 3 of the drawings. The bosom is now stitched across at the lower edge or edges of the stiffening strip or strips, as represented in Fig. 1 of the drawings, which prevents the stiffening from working up and establishes the point where the bosom will break first. The central plait may also be stiffened with one or more strips in the same way as described for the side plaits of Figs. 1 and 2. The extra thickness, or the stiffening aforesaid, may be interwoven with the material of which the bosoms are made in the manufacture of this material, so that when the bosoms are made up the upper portions thereof will be thicker and possess greater stiffness than the lower portions.

Now, it will be seen that the bosoms made as above described as composed of two parts, one of which, being that exposed, is stiffened, while the other, or that part which is generally covered by the vest, is of the same thickness as that exposed, excepting the additional stiffening. Therefore in wearing a shirt with such a bosom, the lower part of the bosom being more flexible than the upper part thereof it will preserve the upper part stiff and smooth for a considerable length of time.

The effect of stiffening the bosom its full length would be the same as in shirts hitherto made, and the same objection would still exist; but where one portion of the bosom is made thinner and less stiff than the other, as herein described, the thin portion will yield or break first, and thus preserve the thicker or stiffened portion neat and smooth.

The termination of the stiffening should be above the waist-band of the pants; otherwise the lower or thin portion of the bosom will have very little effect.

Having thus described my invention, what

I claim as new and desire to secure by Letters Patent, is—

1. A shirt-bosom made with a stiffening strip or strips of suitable material, applied substantially as and for the purposes herein set forth.

2. A shirt-bosom having the upper portion thicker and stiffer than the lower portion, substantially as herein described.

IRA PEREGO, JR.

Witnesses:
R. S. SPENCER,
J. W. COOMBS.